United States Patent [19]

Collier

[11] Patent Number: 5,193,286

[45] Date of Patent: Mar. 16, 1993

[54] MODULAR GAGE

[76] Inventor: Kevin E. Collier, 675 S. 1350 East, Fruit Heights, Utah 84037

[21] Appl. No.: 871,898

[22] Filed: Apr. 21, 1992

[51] Int. Cl.$^5$ .............................................. G01B 5/20
[52] U.S. Cl. ........................................ 33/551; 33/552; 33/1 M; 33/503; 33/557; 33/DIG. 2
[58] Field of Search ................. 33/608, 502, 503, 1 M, 33/545, 546, 551, 552, 553, 554, 557, 560, 568, 573, DIG. 2, 572

[56] References Cited

U.S. PATENT DOCUMENTS

| | | | |
|---|---|---|---|
| 3,425,134 | 2/1969 | Christensen | 33/552 X |
| 4,221,053 | 9/1980 | Bobel, II et al. | 33/552 |
| 4,251,922 | 2/1981 | Perlotto | 33/1 MX |
| 4,400,884 | 8/1983 | Baresh et al. | 33/552 |
| 4,593,476 | 6/1986 | Clark et al. | 33/551 X |
| 4,831,741 | 5/1989 | Sogoian | 33/502 |
| 4,848,005 | 7/1989 | Ercole et al. | 33/568 |

FOREIGN PATENT DOCUMENTS 2040461  8/1980  United Kingdom ................... 33/608

Primary Examiner—William A. Cuchlinski, Jr.
Assistant Examiner—Alvin Wirthlin
Attorney, Agent, or Firm—K. S. Cornaby

[57] ABSTRACT

A flexible, modular gage system is presented for statistical process control to compare the delta dimensional difference between a master part with known dimensional values to one or more manufactured production parts. A main feature of the invention is the gage that holds measurement devices, such as a transducer probe. The components of the modular auto gage allow position of analog, digital or mechanical measurement devices in virtually any position, being limited only by the part-holding device or interference with other measurement devices. Measurement devices once positioned can remain stationary or attached to a precision pneumatic slide. The pneumatic slide retracts the measurement device to allow easy loading and unloading of the part to be gaged.

7 Claims, 6 Drawing Sheets

MODULAR GAGE

BACKGROUND OF THE INVENTION

This application refers to an apparatus and process for gaging the accuracy of manufactured parts. In order for quality control to be successful and profitable it must be done quickly, frequently and at low cost. The earlier in the process quality control gaging takes place, the more useful the information. At present it is typical to inspect only a single sample because of the time and cost involved. It has been the norm to spend a great deal of time to do difficult positioning and inspection of manufactured parts. In addition there has been a need for a very specialized knowledge and training to do gaging. Building gages dedicated to one specific part configuration has for the most part been cost prohibitive except in the case of very high volume production runs. A prior art U.S. Pat. No. 4,831,741 shows that the use of transducer analog measurement devices can simplify dimensional gaging; however, the gage measurement stations are in predetermined locations and orientations. The gages are still very costly and can be totally obsolete after the completion of the specific part to which it was dedicated.

There is a need for a gage using modular components that fasten together in whatever configuration is required to gage a particular part. This would make it possible to use the gage for short production runs; and the gage never becomes obsolete.

SUMMARY OF THE INVENTION

The present invention provides an automated system that is flexible enough to adapt to an infinite number of different configurations of parts. The process of modular auto gaging allows the machine operator to gage parts at the machine and do it so quickly that the data can be collected and analyzed before the next part is manufactured. Lead time can be greatly decreased because the modular gage can be reconfigured to adapt to a new part thus eliminating the long tooling lead time required to build dedicated fixed position gages.

The unique use of precision air slides allows the sensitive measurement device to be retracted a safe distance from the part being gaged. This protects the measurement device and facilitates the loading and unloading of the parts.

Parts to be gaged may be fixtured in a stationary position or may be rotated in a repeatable manner to gather geometric data not otherwise attainable.

All of the components of the modular auto gage can be disassembled and stored in a protective container, computer included.

The present invention is implemented in the manufacturing quality control environment. The modular auto gage is set up by locating the production part to be gaged on a simple locating fixture. The modular components are fastened into the desired position for gaging. A computer is linked to the gage if digital or analog measurement devices are being used. A real time device can.be used to collect simultaneous readings. Such devices provide data to be recorded manually or digitally, and real time analog signals are sent to a computer for collating and analysis. The gage can be reconfigured to gage different parts having different configurations.

A master part that has been measured to determine its exact dimensional values is placed in the gage. The air slides are actuated and the probes come in contact with the manufactured part. There are predetermined stops built into the air slides. By means of the computer software the gage is zeroed and the master part is removed. A production part is loaded and gaged. The delta difference between the master part and the production part is recorded and analyzed in the computer. The actual gaging time is done in seconds, making it economical and possible to engage a larger sample if not 100% of the parts. When the production run is complete the modular auto gage may be disassembled and stored in a protective container, or quickly and easily reconfigured to gage a different part. The flexibility of positioning allows the present invention to be used over and over therefore the cost can be amortized over many different parts in place of being justified for one dedicated part.

DESCRIPTION OF THE DRAWINGS

A preferred embodiment of the invention is illustrated in the accomany drawings, in which.

DETAILED DESCRIPTION OF THE PREFERRED EMBODIMENT

Figure 1:
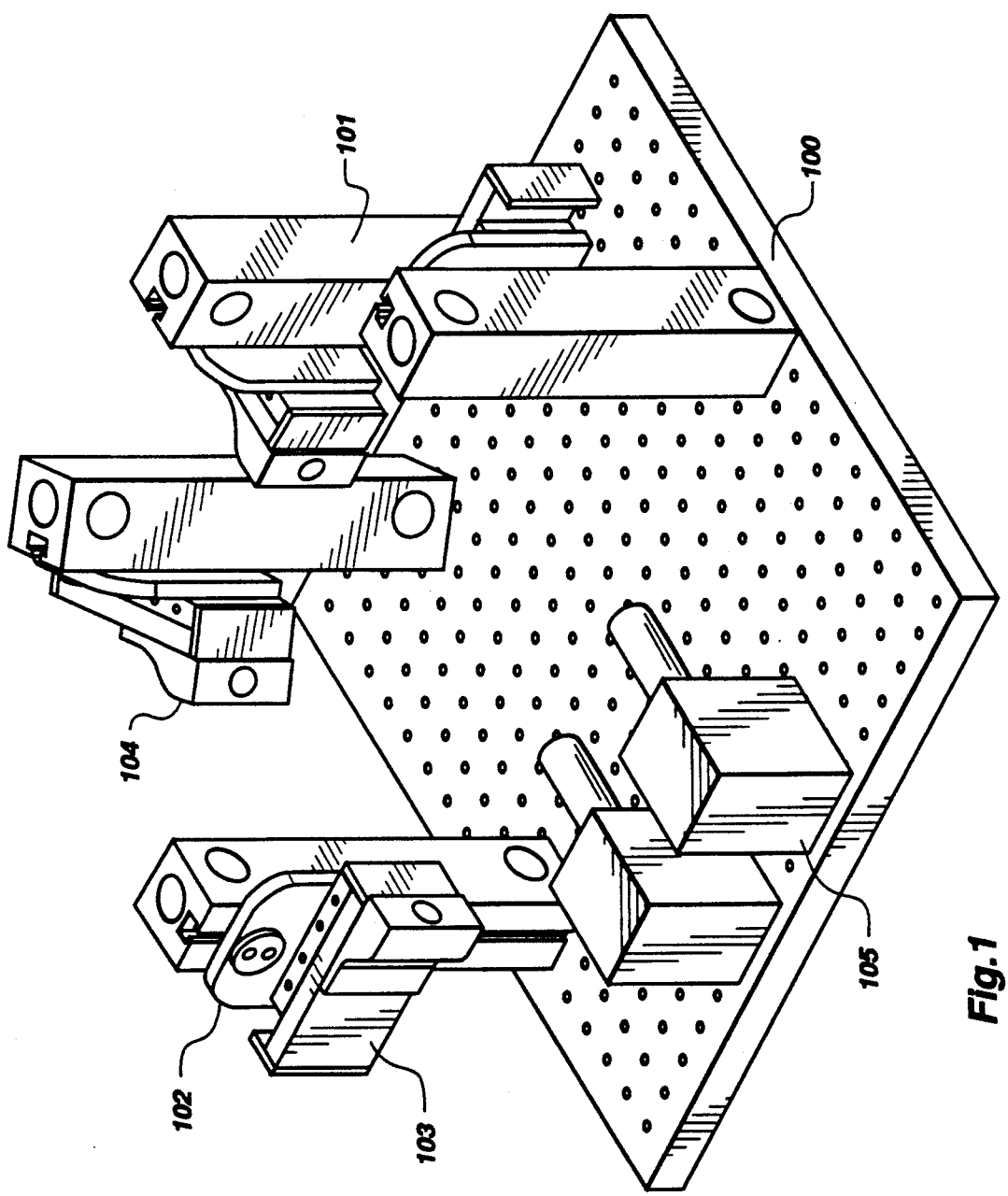
FIG. 1 illustrates the assembled modular auto gage with its various components.

FIG. 1 illustrates the assembled SPC modular auto gage in accordance with the present invention, which includes a base plate 100 upon which the components rest and are attached. Columns 101 are bolted to the base plate with the use of standard threaded rods. The columns 101 can be placed in any position on the base plate 100 and are rotated about their axis 360 degrees, providing infinite positioning capability on the base plate 100. The mounting plates 102 are attached to the columns 101, preferably with the use of shoulder bolts, washer "T" nuts. This allows the mounting plate 102 to rotate 360 degrees and to be positioned anywhere up or down along the length of the column 101. Air slides 103 bolt to the mounting plate 102, which give the gage the forward and reverse motion to retract the probes. The air slides 103 can be attached in several positions on the mounting plates 102.

A universal probe holder 104 bolts to the air slide 103. It can hold many different probes, or custom holders 104 can be fabricated to hold special devices. Each different manufactured part requires at least one simple locating fixture 105 to hold the parts in the same position. These fixtures 105 can be designed to hold the part stationary, or can be made to rotate parts as shown in this illustration. With the modular system of components, virtually any feature on the manufactured part can be reached by the probes, with the only constraints being interference of the location fixture and interference of other probes.

Figure 2:
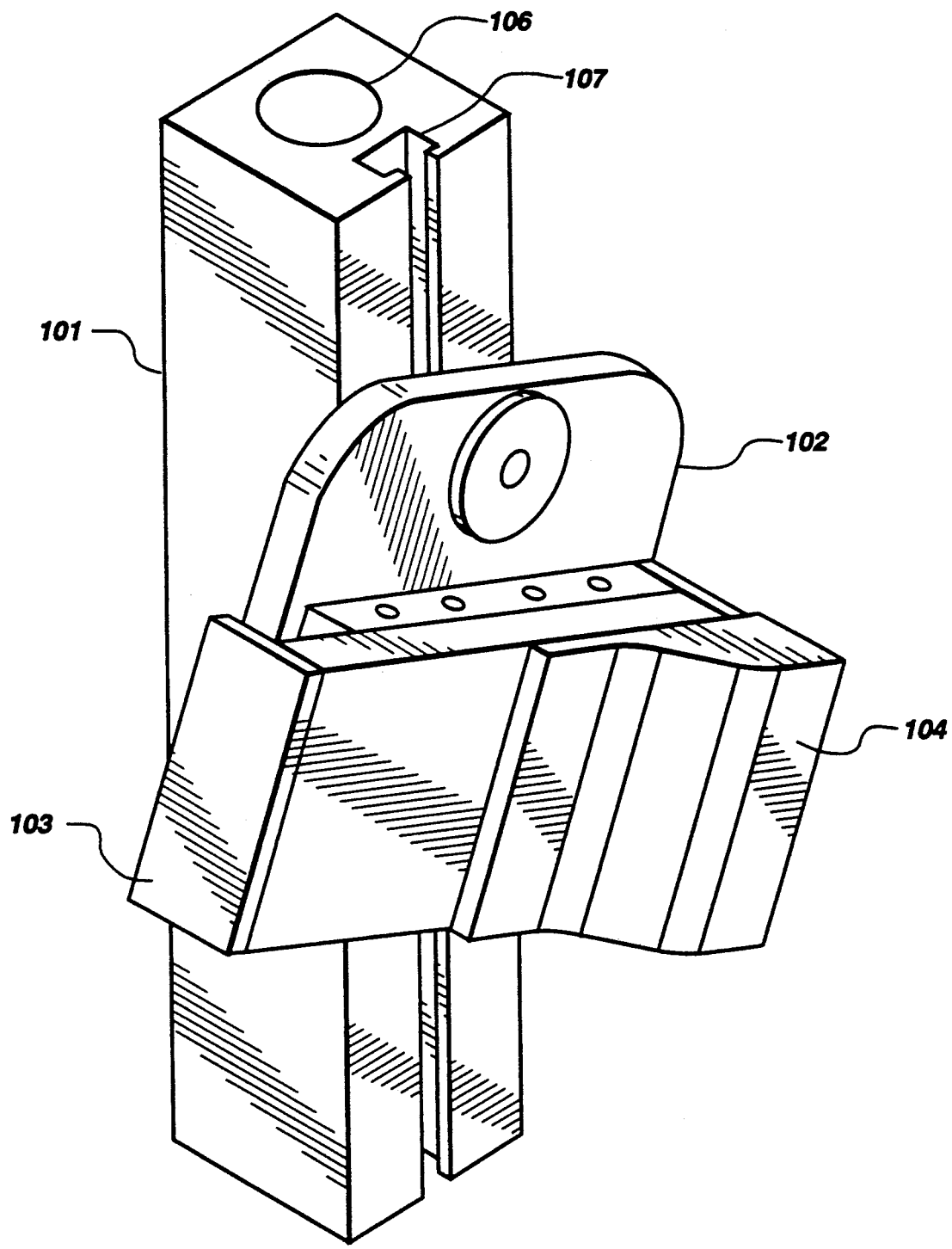
FIG. 2, a subassembly which includes the column, mounting plate, air slide, and probe mount showing the different axes of rotation and motion of which this assembly is capable.

FIG. 2 illustrates column 101, mounting plate 102, air slide 103 and the probe holder 104. Column 102 has a "T" slot 107 running its entire length. Column 101 also has a large aperture 106 running axially which allows it to be positioned any place on the grid of the base plate 100. This illustration shows how the components may be arranged at different angles, orientations and positions.

Figure 3:
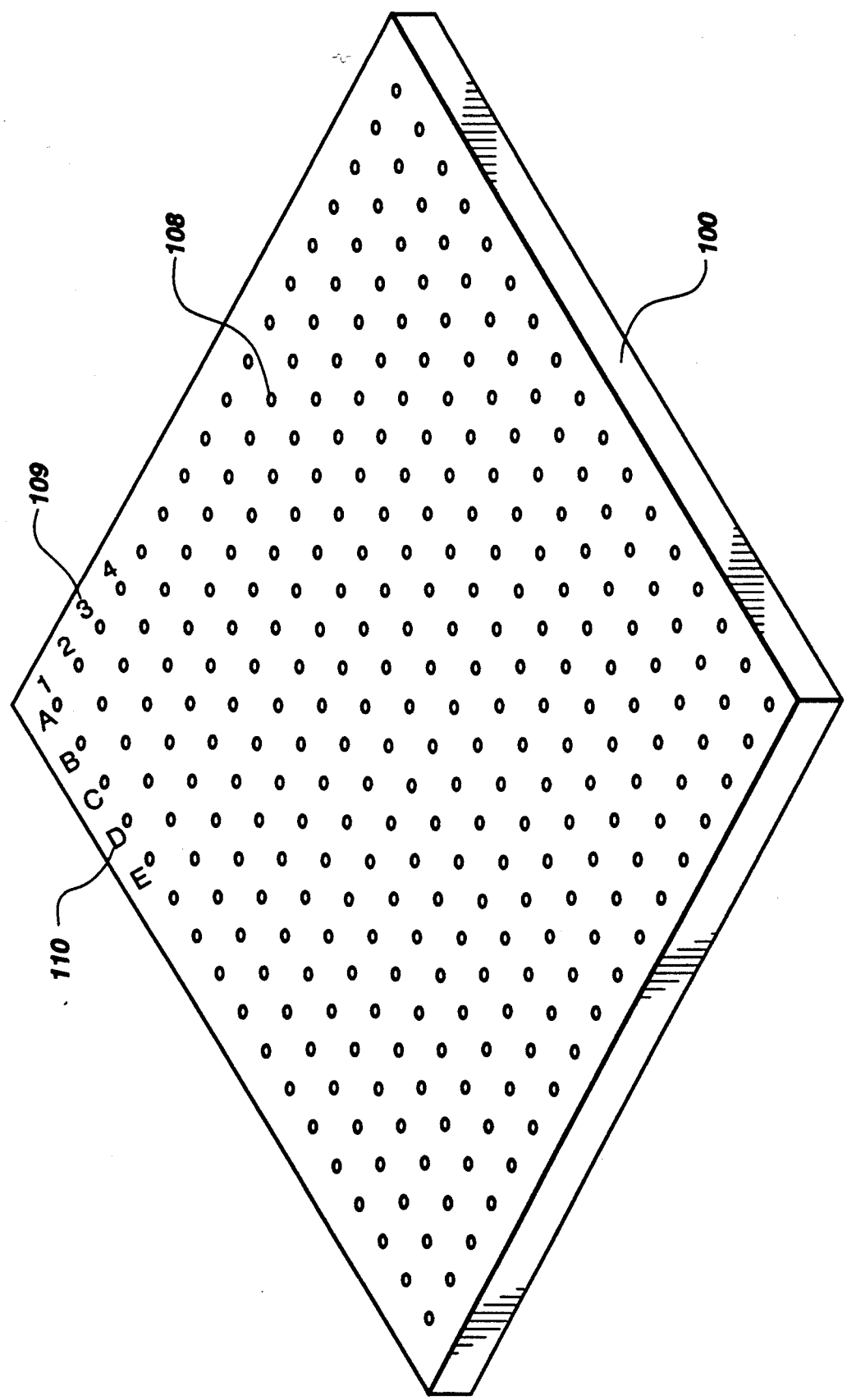
FIG. 3, the base plate to which the components mounts.

FIG. 3 illustrates the base plate 100 which has a hard, thick, flat, smooth and stable surface. There is a grid of threaded apertures 108 to which the other components attach. The rows 110 and columns 109 of apertures are labeled to facilitate repeating a set-up at some future time, or make records of component positions.

Figure 4:
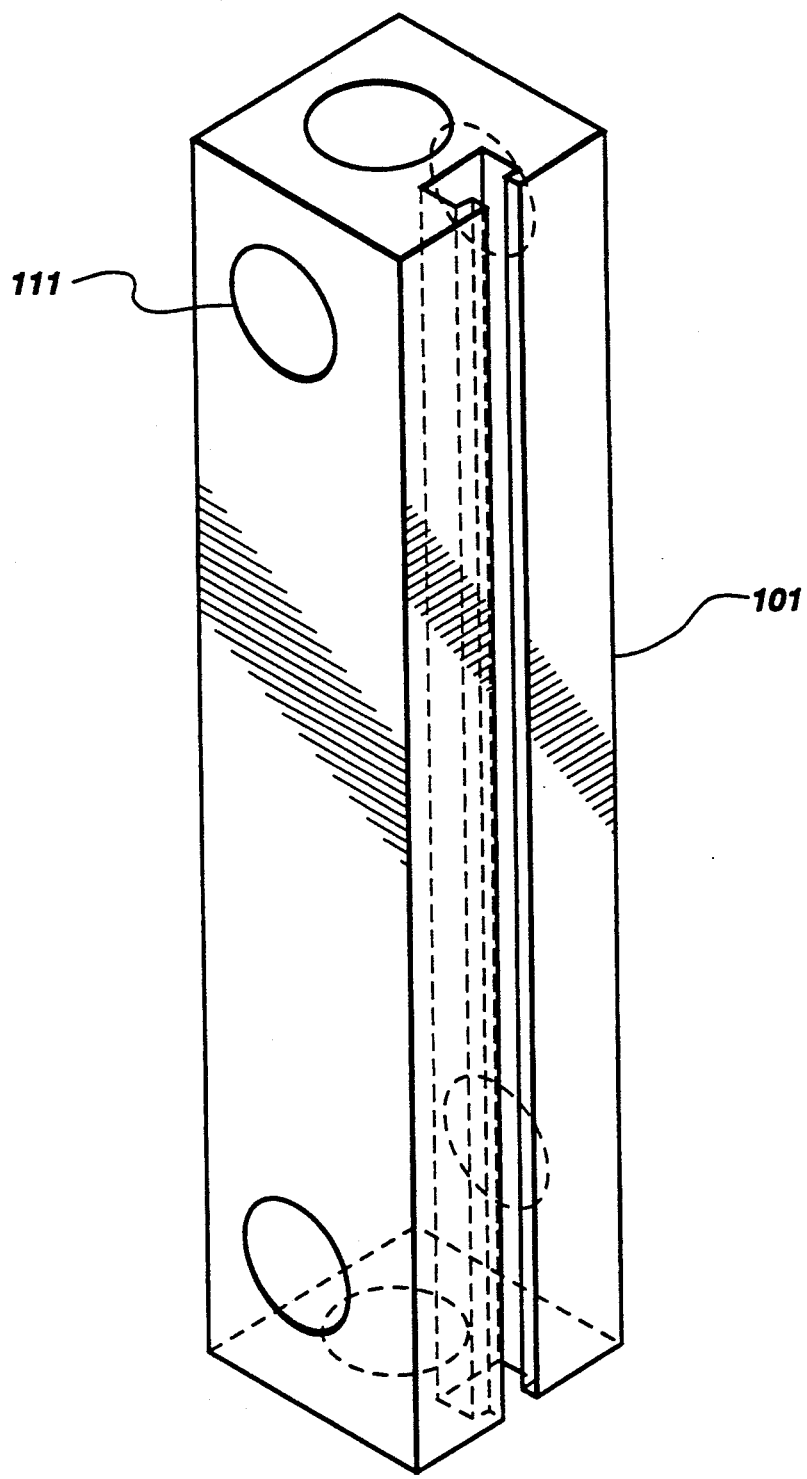
FIG. 4, a column showing various features.

FIG. 4 illustrates a detail of the column 101. It has a large aperture 111 crossways at each end which allows the columns to be bolted together at 90 degrees thereby enabling the columns to bolt together in several different arrangements needed to gage different parts. Columns 101 are made of hard, stable materials with good surface finish.

Figure 5:
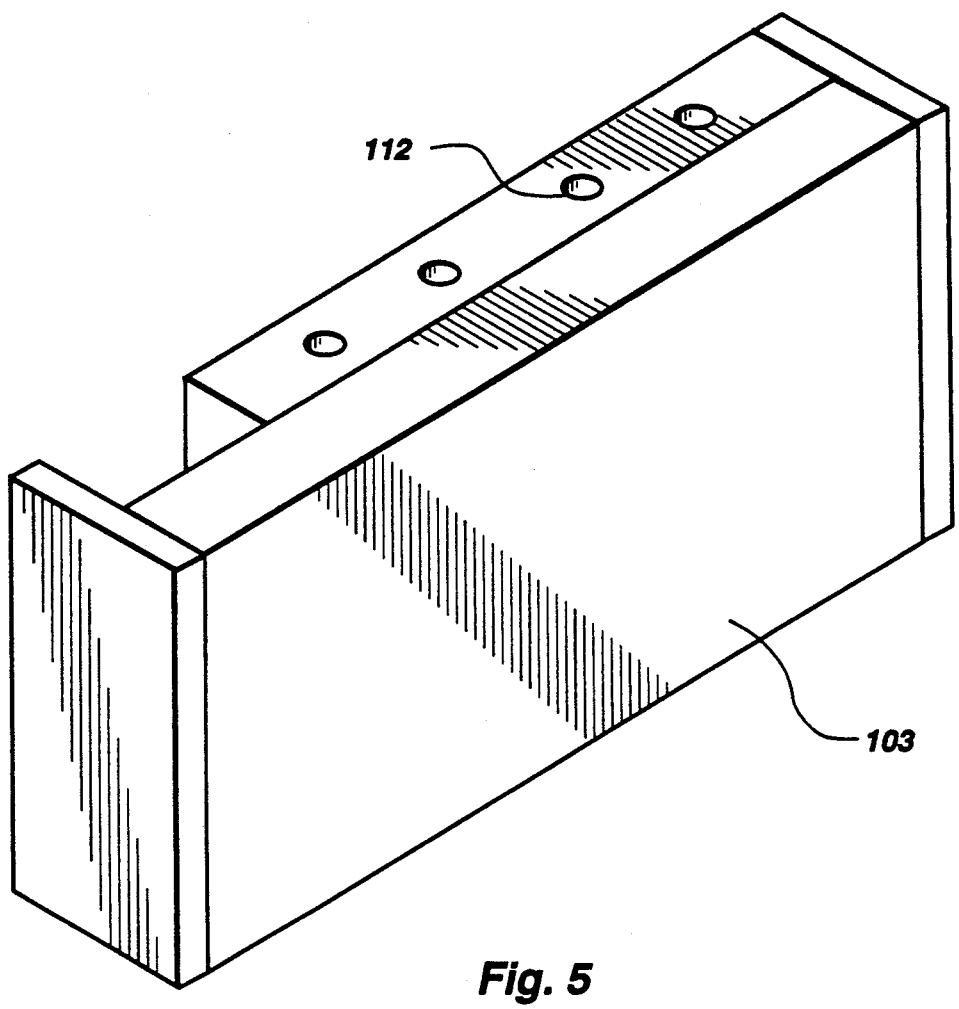
FIG. 5, an air slide extended in one direction.

FIG. 5 illustrates a pneumatic (air) slide 103 to which the probe mounting block 104 is mounted. The use of the air slide allows the probe to be retracted each time the part to be gaged is changed. This retracts the sometimes delicate transducer type probes so that they are not damaged. It also allows the necessary spaced to load and unload faster and more reliable. Each air slide 103 has portals for air hoses 112. These air hoses are connected into one manifold so that they can be actuated simultaneously.

Figure 6:
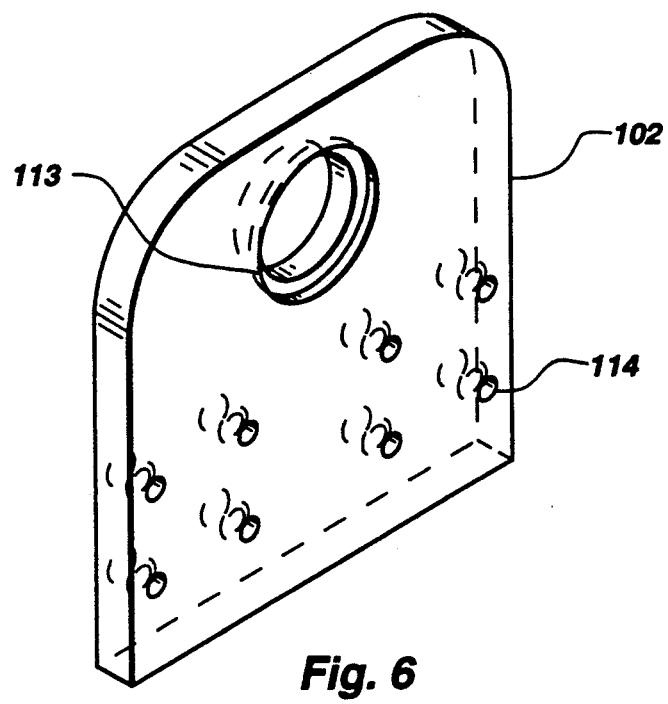
FIG. 6, a mounting plate showing various features.

FIG. 6 illustrates the mounting plate 102. It has a pattern of apertures 114 to which the air slide 103 mounts. This configuration of holes allows the air slide 103 to mount in several different positions allowing more flexibility. There is a large aperture (113) which is used to mount the mounting plate 102 to the column 101 with the aid of a washer, bolts and "T" nut. It is made from strong, lightweight stable material.

Figure 7:
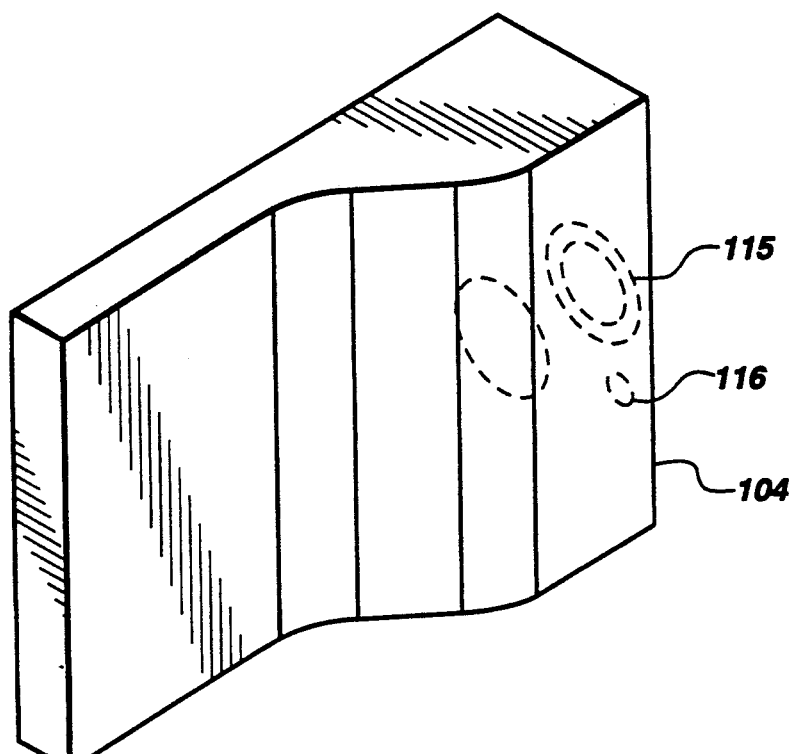
FIG. 7, a mounting block to which the measurement devices mount.

FIG. 7 illustrates the probe holder 104 which has one or more apertures in which the probes (measurement devices) mount with the use of a set screw 116. The probe can slide in and out of the aperture 115 to add a degree of flexibility to the gage. Custom holders can be configured to hold special measurement devices. Data from the measurement devices is sent to a computer for SPC analysis via digital or real-time devices.

I claim:

1. An apparatus for measuring dimensional differences between a master part and reproduced production parts, comprising in combination:
   a base plate having means for attaching component members thereto;
   said component members including at least one vertical column member rotatably attached to said base plate around a vertical axis of said column;
   at least one mounting plate rotatably attached to a vertical side of said column member around an axis perpendicular to said vertical axis;
   at least one air side means attached to said mounting plate; and
   at least one probe holder means attached to said air slide means for holding a probe and for linearly moving said probe holder with respect to said mounting plate.

2. An apparatus as set forth in claim 1, including at least one locating member for holding a part to be measured, said locating member being movably mounted on said base plate.

3. An apparatus as set forth in claim 1, said component members including a plurality of column members each having a said mounting plate, air slide means and probe holder attached thereto.

4. An apparatus as set forth in claim 1, wherein said base plate has a plurality of apertures for mounting at least one column member in a plurality of locations on said base plate.

5. An apparatus as set forth in claim 1, wherein said mounting plate has a plurality of apertures to which said air slide member can be attached.

6. An apparatus as set forth in claim 1, wherein said probe holder has a set screw for securing probes to said probe holder.

7. A process for measuring dimensional differences between a master part and reproduced production parts, comprising the steps of:
   rotatably mounting a vertical column on a base plate around a vertical axis of said column;
   rotatably mounting a mounting plate on the vertical column around an axis perpendicular to said vertical axis;
   mounting an air slide member on the mounting plate;
   mounting a probe holder on the air slide member for holding a probe and for linearly moving said probe holder with respect to said mounting plate; and
   mounting a locating member on the base plate for holding a part to be measured.

* * * * *